US011181377B2

(12) United States Patent
Kitano et al.

(10) Patent No.: US 11,181,377 B2
(45) Date of Patent: Nov. 23, 2021

(54) TRAVEL DIRECTION ESTIMATION DEVICE

(71) Applicant: Mitsubishi Electric Corporation, Chiyoda-ku (JP)

(72) Inventors: Hiroaki Kitano, Tokyo (JP); Yukiyasu Akemi, Tokyo (JP); Masaya Endo, Tokyo (JP); Kazuo Hitosugi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 150 days.

(21) Appl. No.: 16/081,319

(22) PCT Filed: Jan. 13, 2017

(86) PCT No.: PCT/JP2017/001002
§ 371 (c)(1),
(2) Date: Aug. 30, 2018

(87) PCT Pub. No.: WO2017/168945
PCT Pub. Date: Oct. 5, 2017

(65) Prior Publication Data
US 2019/0072391 A1    Mar. 7, 2019

(30) Foreign Application Priority Data
Mar. 30, 2016    (JP) .............................. JP2016-067234

(51) Int. Cl.
*G01C 21/16*    (2006.01)
*G01C 21/28*    (2006.01)
(Continued)

(52) U.S. Cl.
CPC ............. *G01C 21/165* (2013.01); *B62D 6/00* (2013.01); *G01C 21/14* (2013.01); *G01C 21/28* (2013.01); *G01P 13/02* (2013.01); *G08G 1/133* (2013.01)

(58) Field of Classification Search
CPC ....... G01C 21/165; G01C 21/14; G01C 21/28; B62D 6/00; G01P 13/02; G08G 1/133
(Continued)

(56) References Cited

U.S. PATENT DOCUMENTS 5,469,158 A    11/1995    Morita
5,828,987 A  *  10/1998    Tano ................... G01C 21/165
                                                702/150
(Continued)

FOREIGN PATENT DOCUMENTS

CN    103292827 A    9/2013
JP    63-108285 A    5/1988
(Continued)

OTHER PUBLICATIONS

NPL English Translation of Morita (JPH06288776A) (Year: 1994).*
(Continued)

*Primary Examiner* — Bao Long T Nguyen
*Assistant Examiner* — Bakari Underwood
(74) *Attorney, Agent, or Firm* — Xsensus LLP

(57) ABSTRACT

A travel direction estimation device mounted on a vehicle including a position detector and an angular velocity detector to estimate a travel direction of the vehicle includes: a first angle processor calculating a first angle based on a change of a position of the vehicle being detected in the position detector and updated at a predetermined time interval, a second angle processor calculating a second angle based on a rotational angular velocity of the vehicle being detected in the angular velocity detector and a detection interval of the position of the vehicle in the position detector, and a travel direction processor calculating the travel direction of the vehicle based on the first angle and the second angle. The travel direction estimation device can estimate a travel direction of a vehicle with a high degree of accuracy.

12 Claims, 10 Drawing Sheets

(51) Int. Cl.
    *B62D 6/00*         (2006.01)
    *G08G 1/133*      (2006.01)
    *G01P 13/02*      (2006.01)
    *G01C 21/14*      (2006.01)

(58) Field of Classification Search
    USPC ........................................................ 701/472
    See application file for complete search history.

(56) References Cited

U.S. PATENT DOCUMENTS

| 2007/0239347 A1* | 10/2007 | Watanabe | .............. G01C 21/28 |
| | | | 701/469 |
| 2017/0184403 A1* | 6/2017 | Kumabe | ................ G01C 21/16 |

FOREIGN PATENT DOCUMENTS

| JP | 3-282324 A | | 12/1991 |
| JP | 6-288776 A | | 10/1994 |
| JP | 06288776 A | * | 10/1994 |
| JP | 7-280575 A | | 10/1995 |
| JP | 2011-246100 A | | 12/2011 |

OTHER PUBLICATIONS

International Search Report dated Feb. 28, 2017 in PCT/JP2017/001002 filed Jan. 13, 2017.
Chinese Office Action dated Jun. 15, 2021, in corresponding Chinese Patent Application No. 201780018675.0.
Office Action dated Sep. 1, 2021, in corresponding Chinese patent Application No. 201780018675.0, 21 pages.

* cited by examiner

TRAVEL DIRECTION ESTIMATION DEVICE

TECHNICAL FIELD

The present invention relates to a travel direction estimation device for estimating a travel direction of a moving vehicle.

BACKGROUND ART

Patent Document 1 describes a travel direction estimation device, for example, as a conventional travel direction estimation device. The travel direction estimation device described in Patent Document 1 inputs a travel direction signal and a rotational angular velocity signal obtained from a GPS (global positioning system) receiver to estimate a travel direction of a vehicle. The travel direction estimation device described in Patent Document 1 increases dependency on the travel direction signal and reduces dependency on the rotational angular velocity signal obtained from the GPS receiver in the estimation of the travel direction when the vehicle moves at high speed. In the meanwhile, the travel direction estimation device described in Patent Document 1 reduces the dependency on the travel direction signal and increases the dependency on the rotational angular velocity signal obtained from the GPS receiver in the estimation of the travel direction when the vehicle moves at low speed.

PRIOR ART DOCUMENTS

Patent Documents

Patent Document 1: Japanese Patent Application Laid-Open No. 3-282324

SUMMARY

Problem to be Solved by the Invention

The conventional travel direction estimation device changes the dependency on the travel direction signal and the dependency on the rotational angular velocity obtained from the GPS receiver in accordance with a vehicle speed to calculate the travel direction. However, an error between the travel direction signal obtained from the GPS receiver and a travel direction which is truly desired to be obtained does not necessarily depend on the vehicle speed. Accordingly, the conventional travel direction estimation device cannot necessarily estimate the travel direction of the vehicle with a high degree of accuracy. Particularly, there is a possibility in the conventional travel direction estimation device that the error of the estimated travel direction relative to an actual travel direction increases when an update interval of positional information of the vehicle obtained from the GPS receiver is long.

The present invention therefore has been made to solve these problems, and it is an object of the present invention to obtain a travel direction estimation device capable of estimating a travel direction of a vehicle with a high degree of accuracy even when an update interval of positional information of the vehicle is long.

Means to Solve the Problem

A travel direction estimation device in the present invention is a travel direction estimation device being mounted on a vehicle including a position detector and an angular velocity detector to estimate a travel direction of the vehicle, and includes a first angle processor calculating a first angle based on a change of a position of the vehicle being detected in the position detector and updated at a predetermined time interval, a second angle processor calculating a second angle based on a rotational angular velocity of the vehicle being detected in the angular velocity detector and an update interval of the position of the vehicle being detected in the position detector, and a travel direction processor calculating the travel direction of the vehicle based on the first angle and the second angle, wherein the second angle processor calculates the second angle $\theta_c$ by a calculation of $\theta_c=(\gamma \times T)/2$ using the rotational angular velocity $\gamma$ and the update interval T.

Effects of the Invention

A travel direction estimation device in the present invention includes a first angle processor calculating a first angle based on a change of a position of the vehicle being detected in the position detector and updated at a predetermined time interval, a second angle processor calculating a second angle based on a rotational angular velocity of the vehicle being detected in the angular velocity detector and an update interval of the position of the vehicle being detected in the position detector, and a travel direction processor calculating the travel direction of the vehicle based on the first angle and the second angle. Thus, the travel direction of the vehicle can be estimated with a high degree of accuracy even when the update interval of the positional information of the vehicle is long.

DESCRIPTION OF EMBODIMENT(S)

Embodiment 1

Figure 1:
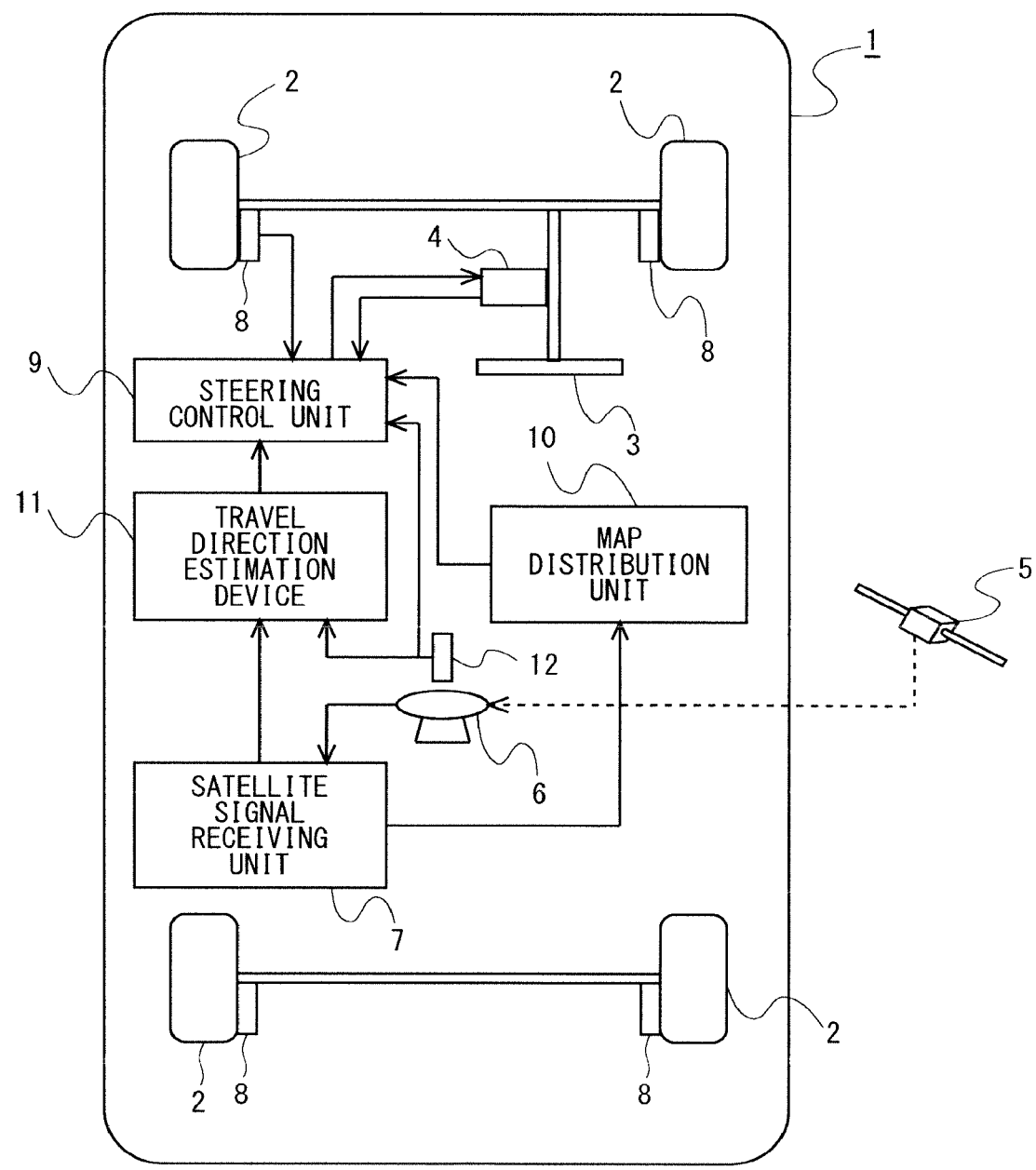
FIG. 1 A diagram illustrating an example of a system configuration of a vehicle provided with a travel direction estimation device according to an embodiment 1 of the present invention.

FIG. 1 is a diagram illustrating an example of a system configuration of a vehicle 1 provided with a travel direction estimation device 11 in the present embodiment 1. In FIG. 1, the vehicle 1 includes wheels 2, a handle 3, a steering unit 4, an antenna 6, a satellite signal receiving unit 7, vehicle speed sensors 8, a steering control unit 9, a map distribution unit 10, the travel direction estimation device 11, and a yaw rate sensor 12. In the vehicle system illustrated in FIG. 1, the steering unit 4 operates in accordance with a steering command value being input from the steering control unit 9 to perform the steering control so that the vehicle 1 moves along a road. The steering unit 4 is made up of an EPS (electrical power steering) motor and an ECU (electronic control unit). The ECU may have a calculator and a memory such as a microcomputer and have a dedicated electronic circuit. When the steering unit 4 operates in accordance with the steering command value being input from the steering control unit 9, a rotation of the handle 3 and a direction of the wheels 2 can be controlled.

The antenna 6 receives a satellite signal transmitted from a satellite 5 located outside the vehicle 1, and outputs the received satellite signal to the satellite signal receiving unit 7. The satellite 5 is made up of a plurality of GPS (global positioning system) satellites, for example. Although the present embodiment describes a case where the satellite 5 is made up of a GPS satellite, its configuration is not limited thereto, but the other positioning satellite such as a GLONASS (global navigation satellite system) may also be adopted.

The satellite signal receiving unit 7 is made up of a GPS receiver, processes the satellite signal received by the antenna 6, and detects a position of the vehicle 1, thereby generating a positional signal. The satellite signal receiving unit 7 detects the position of the vehicle 1 every update interval T and updates the positional signal. That is to say, the update interval T is a detection interval of the position of the vehicle 1 in the satellite signal receiving unit 7 and an update interval of the positional signal being output from the satellite signal receiving unit 7. The satellite signal receiving unit 7 outputs the positional signal to the map distribution unit 10 and the travel direction estimation device 11. That is to say, the satellite signal receiving unit 7 functions as a position detection unit detecting the position of the vehicle 1. Although the present embodiment has a configuration of adopting the GPS receiver as the satellite signal receiving unit 7, a receiver corresponding to the other system such as a GLONASS may also be adopted. The satellite signal receiving unit 7 may have a configuration of obtaining correction information from the satellite 5 or a configuration of obtaining correction information via Internet to detect the position with a high degree of accuracy. The satellite signal receiving unit 7 may also have a configuration corresponding to a DGPS (differential GPS).

The yaw rate sensor 12 detects a yaw rate which is a rotational angular velocity of the vehicle 1, and outputs the detected yaw rate to the steering control unit 9 and the travel direction estimation device 11. That is to say, the yaw rate sensor 12 functions as an angular velocity detection unit detecting the rotational angular velocity of the vehicle 1. The travel direction estimation device 11 estimates the travel direction of the vehicle 1 based on the yaw rate being input from the yaw rate sensor 12 and the positional signal being input from the satellite signal receiving unit 7, and output the travel direction to the steering control unit 9. The travel direction estimation device 11 of the present embodiment estimates the travel direction of the vehicle 1 every update interval T of the position of the vehicle 1 in the satellite signal receiving unit 7. In other words, the travel direction estimation device 11 of the present embodiment estimates the travel direction of the vehicle 1 every time the position of the vehicle 1 is detected in the satellite signal receiving unit 7. The travel direction obtained in the travel direction estimation device 11 is expressed by an angle from a predetermined direction, for example. The travel direction estimation device 11 is made up of an ECU, for example. An inner configuration and details of an operation of the travel direction estimation device 11 are described hereinafter.

The map distribution unit 10 outputs the position of the vehicle 1 on a map and road information in front of the vehicle 1 based on the positional signal being input from the satellite signal receiving unit 7. The map distribution unit 10 outputs latitude and longitude, a total number of traffic lanes, and a curvature, for example, in each point in a traffic lane along which the vehicle moves. The map distribution unit 10 may input the travel direction of the vehicle 1 being output from the travel direction estimation device 11, and output the position of the vehicle 1 and the road information in front of the vehicle 1 converted into a coordinate system, in which the travel direction of the vehicle 1 is set as a predetermined coordinate axis, centering on the position of the vehicle 1 or a position surrounding the vehicle 1. The map distribution unit 10 is made up of an ECU, for example.

The vehicle speed sensors 8 detect a travel speed of the vehicle 1 and output a detected vehicle speed V to the steering control unit 9. The vehicle 1 illustrated in FIG. 1 has a configuration that one of the vehicle speed sensors 8 located on the four wheels 2 detects the vehicle speed V, however, the other configuration is also applicable. For example, an average of speeds detected by the four vehicle speed sensors 8 may be adopted as the vehicle speed V. It is also applicable to use the vehicle speed sensors 8 located on the two wheels 2 on a rear side of the vehicle 1 and adopt an average of speeds detected by the two vehicle speed sensors 8 as the vehicle speed V.

The steering control unit 9 is constituted as an ECU generating the steering command value transmitted to the steering unit 4. The steering control unit 9 obtains a targeted steering angle based on the vehicle speed V being input from the vehicle sensor 8, the travel direction being input from the travel direction estimation device 11, the position of the vehicle and the road information being input from the map distribution unit 10, and the yaw rate being input from the yaw rate sensor 12, and outputs the steering angle to the steering unit 4 as the steering command value. The steering control unit 9 obtains a state of the steering unit 4. In FIG. 1, the satellite signal receiving unit 7 and the travel direction estimation device 11 are configured separately, however, they may also be integrally configured, and processing of both of them may be performed in the same ECU, for example. Furthermore, they may also be integrally configured together with the steering control unit 9.

Figure 2:
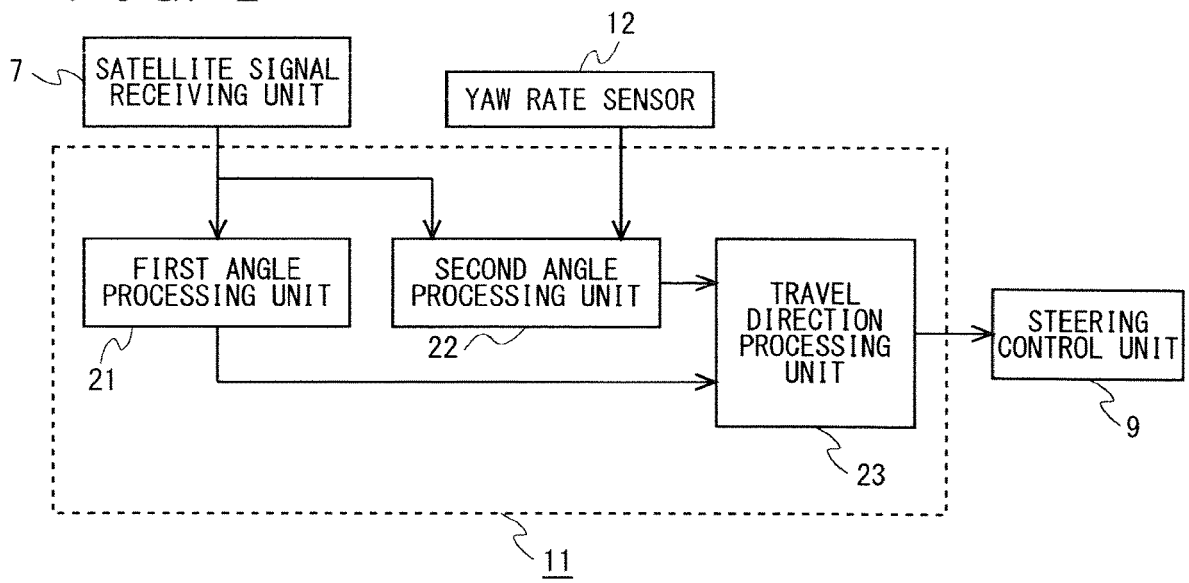
FIG. 2 A block diagram illustrating a schematic configuration of the travel direction estimation device according to the embodiment 1 of the present invention and a surrounding block.
Figure 3:
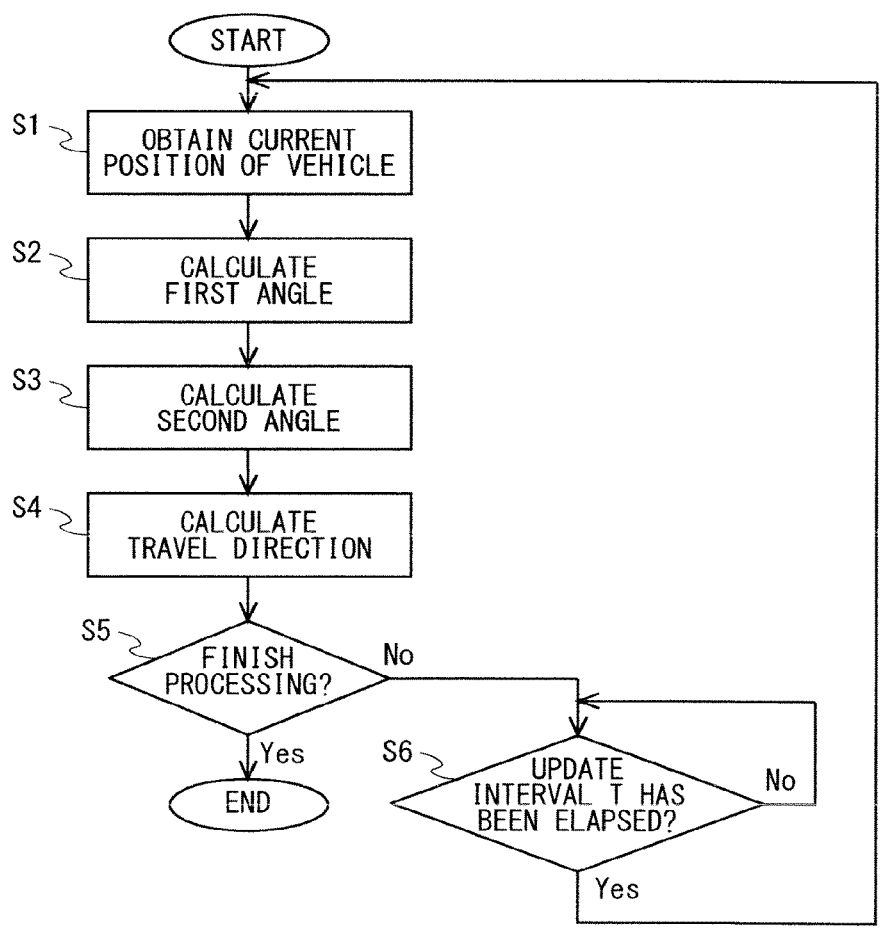
FIG. 3 A flow chart illustrating an example of a processing procedure of the travel direction estimation device according to the embodiment 1 of the present invention.

Next, the configuration and operation of the travel direction estimation device 11 are described with reference to FIG. 2 and FIG. 3. FIG. 2 is a block diagram illustrating a schematic configuration of the travel direction estimation device 11 according to the present embodiment and a surrounding block. FIG. 3 is a flow chart illustrating an example of a processing procedure of the travel direction estimation device 11 according to the present embodiment. In FIG. 2, the travel direction estimation device 11 includes a first angle processing unit 21, a second angle processing unit 22, and a travel direction processing unit 23. A specific operation of the travel direction estimation device 11 is described hereinafter, also using FIG. 3.

Firstly, the first angle processing unit 21 obtains a current position of the vehicle 1 from the satellite signal receiving unit 7 (S1). The first angle processing unit 21 obtains the position of the vehicle 1 every update interval T of the position of the vehicle 1 in the satellite signal receiving unit 7. The current position of the vehicle 1 herein means a latest position of the vehicle 1 detected in the satellite signal receiving unit 7. In other words, the current position of the vehicle 1 is a position of the vehicle 1 updated at a latest past update time in the satellite signal receiving unit 7. The first angle processing unit 21 also stores the position of the vehicle 1 which has been obtained last time. The position of the vehicle 1 which has been obtained last time is the position of the vehicle 1 at a point of time back to the past by the update interval T from the current position of the vehicle 1. That is to say, the position of the vehicle 1 which has been obtained last time is the position of the vehicle 1 which has been detected at the previous detection time compared to the latest position of the vehicle 1 detected in the satellite signal receiving unit 7. In other words, the position of the vehicle 1 which has been obtained last time is the position of the vehicle 1 immediately before being updated to the latest position of the vehicle 1 in the satellite signal receiving unit 7. When a time at which the travel direction estimation device 11 estimates the travel direction of the vehicle 1 is a current time, the current position of the vehicle 1 is the position of the vehicle 1 which has been updated at the past update time T1 closest to the present. The position of the vehicle 1 which has been obtained last time is the position of the vehicle 1 at a point of time back to the past by the update interval T from the update time T1. Next, the first angle processing unit 21 calculates a first angle based on a current position of the vehicle 1 ($X_n$, $Y_n$) and a position of the vehicle 1 which has been obtained last time ($X_{n-1}$, $Y_{n-1}$) (S2).

Figure 4:
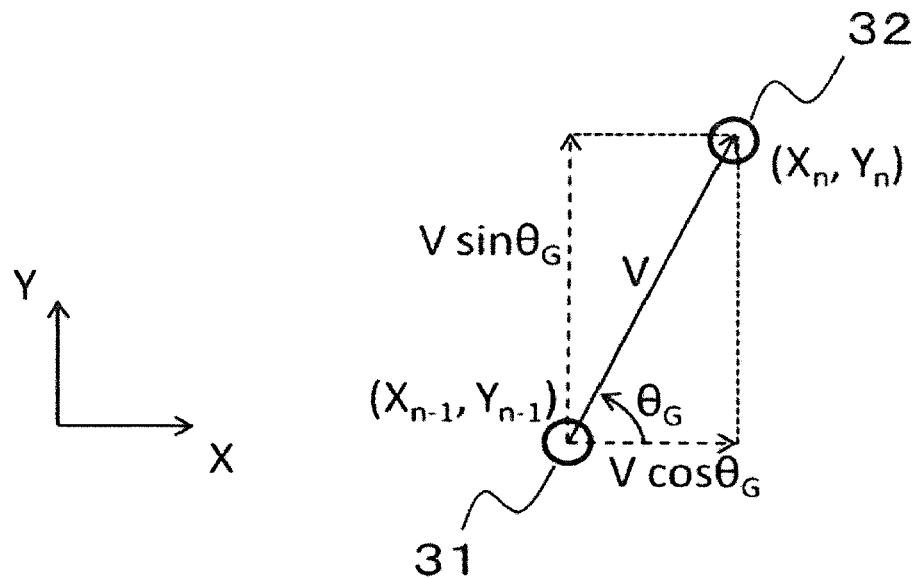
FIG. 4 A diagram for describing an operation of a first angle processing unit in the travel direction estimation device according to the embodiment 1 of the present invention.

FIG. 4 is a diagram for describing an operation of the first angle processing unit 21 in the travel direction estimation device 11 according to the present embodiment. In FIG. 4, for example, an X direction indicates a position in a longitudinal direction (east-west direction), and a Y direction indicates a position in a latitude direction (north-south direction). FIG. 4 illustrates that the vehicle 1 moves from a position 31 of the vehicle 1 which has been obtained last time ($X_{n-1}$, $Y_{n-1}$) to a current position 32 of the vehicle 1 ($X_n$, $Y_n$) at a vehicle speed V, and V cos $\theta_G$ is an X direction component of the vehicle speed, and V sin $\theta_G$ is a Y direction component of the vehicle speed. Herein, each of $X_n$ and $Y_n$ is a position indicating a position in the longitudinal direction and the latitude direction as a position relative to a reference position.

Although the current position 32 of the vehicle 1 ($X_n$, $Y_n$) is used as the reference position in the present embodiment, a predetermined position near the vehicle 1 may be used as the reference position. A unit of $X_n$ and $Y_n$ is m (meter). When the positional signal of the vehicle 1 being input from the satellite signal receiving unit 7 is expressed by longitude and latitude, the first angle processing unit 21 converts the positional signal into $X_n$ and $Y_n$. The first angle processing unit 21 calculates a first angle $\theta_G$ from an equation (1) using the current position 32 of the vehicle 1 ($X_n$, $Y_n$) and the position 31 of the vehicle 1 which has been obtained last time ($X_{n-1}$, $Y_{n-1}$). In the equation (1), arctan ( ) is a function for obtaining arc tangent. The above is the operation of the first angle processing unit 21 in S2 in FIG. 3.

$$\theta_G = \arctan\left(\frac{Y_n - Y_{n-1}}{X_n - X_{n-1}}\right) \quad (1)$$

Next, the second angle processing unit 22 calculates a second angle $\theta_C$ from an equation (2) using a yaw rate $\gamma$ being input from the yaw rate sensor 12 and the update interval T of the position of the vehicle 1 being input from the satellite signal receiving unit 7 (S3). In the travel direction estimation device 11 of the present embodiment, a predetermined update interval, that is one second, for example, is adopted as the update interval T of the position of the vehicle 1. Accordingly, the update interval T being input from the satellite signal receiving unit 7 is a fixed value. When the update interval T is the fixed value, it is also applicable to store the update interval T in the second angle processing unit 2 in advance instead of inputting the update interval T from the satellite signal receiving unit 7. The second angle processing unit 22 normally calculates the second angle $\theta_C$ using the latest yaw rate $\gamma$ being input from the yaw rate sensor 12.

$$\theta_C = \frac{1}{2}\gamma T \quad (2)$$

Next, the travel direction processing unit 23 calculates a travel direction $\Psi$ of the vehicle 1 from an equation (3) using the first angle $\theta_G$ calculated by the first angle processing unit 21 and the second angle $\theta_C$ calculated by the second angle processing unit 22 (S4).

$$\Psi = \theta_G + \theta_C \quad (3)$$

Next, the travel direction estimation device 11 determines whether or not the processing should be finished (S5). When the travel direction estimation device 11 determines that the processing should be finished, the travel direction estimation device 11 finishes the processing. When the travel direction estimation device 11 determines that the processing should not be finished, the processing of the travel direction estimation device 11 makes a transition to S6. In S6, the travel direction estimation device 11 determines whether or not a time which has been elapsed since the first angle processing unit 21 obtains the position of the vehicle 1 in S1 reaches the update interval T. When the time of the update interval T has not been elapsed, the travel direction estimation device 11 waits until the time of the update interval T is elapsed. When the time of the update interval T has been elapsed, the processing of the travel direction estimation device 11 returns to S1.

Figure 5:
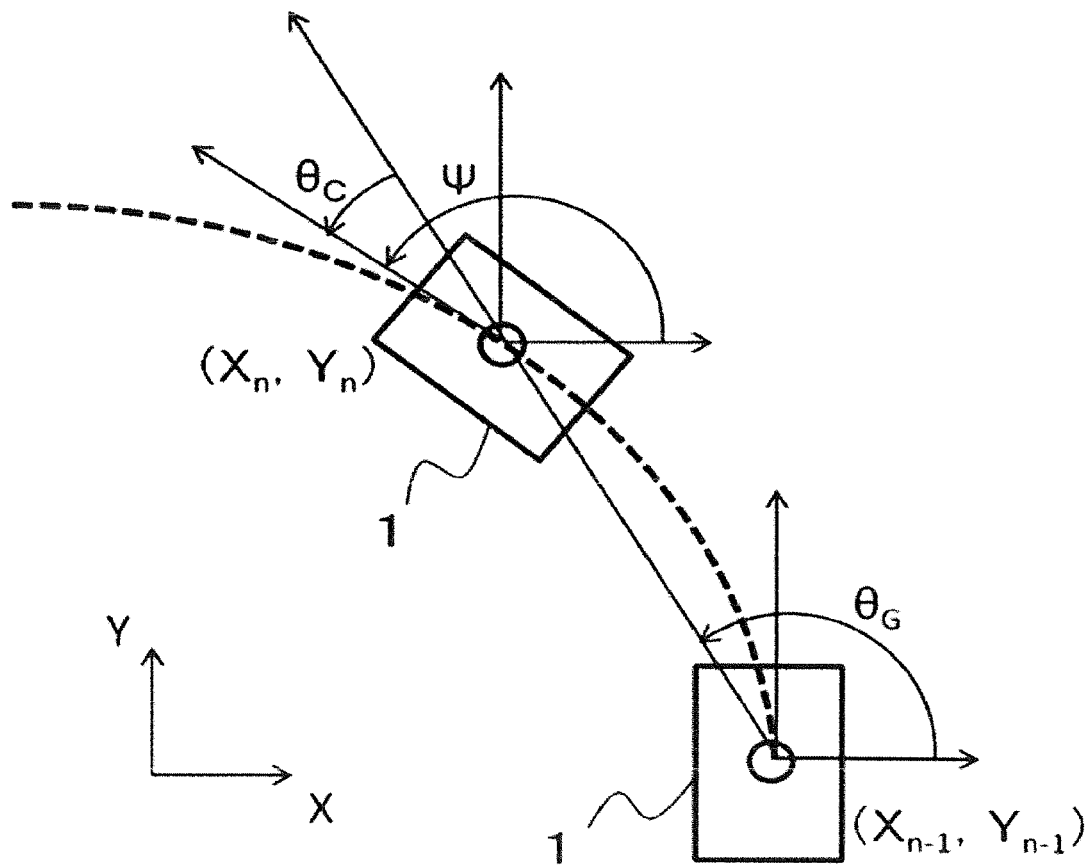
FIG. 5 A diagram for describing an operation of the travel direction estimation device according to the embodiment 1 of the present invention.

The travel direction estimation device 11 operates as described above to estimate the travel direction Ψ of the vehicle 1. Described herein is a reason that the travel direction processing unit 23 adds the second angle $\theta_C$ to the first angle $\theta_G$ to calculate the travel direction Ψ of the vehicle 1. FIG. 5 is a diagram for describing an operation of the travel direction estimation device 11 according to the present embodiment. In FIG. 5, for example, an X direction indicates a position in a longitudinal direction (east-west direction), and a Y direction indicates a position in a latitude direction (north-south direction). As illustrated in FIG. 5, when the position of the vehicle 1, which constantly circles, changes from $(X_{n-1}, Y_{n-1})$ to $(X_n, Y_n)$, the first angle obtained from the position of the vehicle 1 is $\theta_G$ illustrated in FIG. 5. However, the vehicles 1 faces in a tangential direction of a clearance circle as illustrated in FIG. 5, so that an error occurs between the first angle $\theta_G$ and an actual travel direction Ψ of the vehicle. The error increases as the update interval T of the position of the vehicle 1 in the satellite signal receiving unit 7 gets longer.

Thus, when the vehicle speed at a time nT is $V_n$ and the change of the vehicle speed $V_n$ in the update interval T of the position approximates to be sufficiently small, the change of the position of the vehicle 1 from a time (n−1)T to the time nT illustrated in FIG. 5 is expressed by an equation (4) and an equation (5). The position of the vehicle 1 at the time (n−1)T is $(X_{n-1}, Y_{n-1})$, and the position of the vehicle 1 at the time nT is $(X_n, Y_n)$. Herein, an additional character n in the equations indicates each variable at the time nT. The character of n is an integral number.

$$X_n = X_{n-1} + \int_{(n-1)T}^{nT} V_n \cos(\psi_n + \gamma_n(\tau - nT)) d\tau \quad (4)$$

$$\approx X_{n-1} + V_n \int_{(n-1)T}^{nT} \cos(\psi_n + \gamma_n(\tau - nT)) d\tau$$

$$= X_{n-1} + V_n \int_{(n-1)T}^{nT} (\cos(\psi_n)\cos(\gamma_n(\tau - nT)) - \sin(\psi_n)\sin(\gamma_n(\tau - nT))) d\tau$$

$$= X_{n-1} + \frac{V_n}{\gamma_n}((\cos(\psi_n)\sin(\gamma_n T)) + \sin(\psi_n)(1 - \cos(\gamma_n T)))$$

$$= X_{n-1} + \frac{V_n}{\gamma_n}\left(\left(2\cos(\psi_n)\sin\left(\frac{\gamma_n T}{2}\right)\cos\left(\frac{\gamma_n T}{2}\right)\right) + 2\sin(\psi_n)\sin^2\left(\frac{\gamma_n T}{2}\right)\right)$$

$$= X_{n-1} + \frac{2V_n}{\gamma_n}\sin\left(\frac{\gamma_n T}{2}\right)\left(\left(\cos(\psi_n)\cos\left(\frac{\gamma_n T}{2}\right)\right) + \sin(\psi_n)\sin\left(\frac{\gamma_n T}{2}\right)\right)$$

$$= X_{n-1} + \frac{2V_n}{\gamma_n}\sin\left(\frac{\gamma_n T}{2}\right)\cos\left(\psi_n - \frac{\gamma_n T}{2}\right)$$

$$Y_n = Y_{n-1} + \int_{(n-1)T}^{nT} V_n \sin(\psi_n + \gamma_n(\tau - nT)) d\tau \quad (5)$$

$$\approx Y_{n-1} + V_n \int_{(n-1)T}^{nT} \sin(\psi_n + \gamma_n(\tau - nT)) d\tau$$

$$= Y_{n-1} + V_n \int_{(n-1)T}^{nT} (\sin(\psi_n)\cos(\gamma_n(\tau - nT)) + \cos(\psi_n)\sin(\gamma_n(\tau - nT))) d\tau$$

$$= Y_{n-1} + \frac{V_n}{\gamma_n}((\sin(\psi_n)\sin(\gamma_n T)) - \cos(\psi_n)(1 - \cos(\gamma_n T)))$$

$$= Y_{n-1} + \frac{V_n}{\gamma_n}\left(\left(2c\sin(\psi_n)\sin\left(\frac{\gamma_n T}{2}\right)\cos\left(\frac{\gamma_n T}{2}\right)\right) - 2\cos(\psi_n)\sin^2\left(\frac{\gamma_n T}{2}\right)\right)$$

$$= Y_{n-1} + \frac{2V_n}{\gamma_n}\sin\left(\frac{\gamma_n T}{2}\right)\left(\left(\sin(\psi_n)\cos\left(\frac{\gamma_n T}{2}\right)\right) + \cos(\psi_n)\sin\left(\frac{\gamma_n T}{2}\right)\right)$$

$$Y_{n-1} + \frac{2V_n}{\gamma_n}\sin\left(\frac{\gamma_n T}{2}\right)\sin\left(\psi_n - \frac{\gamma_n T}{2}\right)$$

In accordance with the equation (1), the equation (4), and the equation (5), a first angle $\theta_{Gn}$ at the time nT calculated from the positional change of the vehicle 1 is expressed by an equation (6). In accordance with the equation (6), an actual travel direction $\Psi_n$ of the vehicle 1 at the time nT is expressed by an equation (7). Thus, in the travel direction processing unit 23, the actual travel direction $\Psi_n$ of the vehicle 1 at the time nT can be estimated by adding a second angle $\theta_{Cn}$ at the time nT to the first angle $\theta_{Gn}$ at the time nT. As described above, the travel direction processing unit 23 adds the second angle $\theta_C$ to the first angle $\theta_G$ to calculate the travel direction Ψ of the vehicle 1.

$$\theta_{Gn} = \arctan\left(\frac{Y_n - Y_{n-1}}{X_n - X_{n-1}}\right) \quad (6)$$

$$= \arctan\left(\frac{\frac{2V_n}{\gamma_n}\sin\left(\frac{\gamma_n T}{2}\right)\sin\left(\psi_n - \frac{\gamma_n T}{2}\right)}{\frac{2V_n}{\gamma_n}\sin\left(\frac{\gamma_n T}{2}\right)\cos\left(\psi_n - \frac{\gamma_n T}{2}\right)}\right)$$

$$= \arctan\left(\frac{\sin\left(\psi_n - \frac{\gamma_n T}{2}\right)}{\cos\left(\psi_n - \frac{\gamma_n T}{2}\right)}\right)$$

$$= \psi_n - \frac{\gamma_n T}{2}$$

$$= \psi_n - \theta_{Cn}$$

$$\psi_n = \theta_{Gn} + \theta_{Cn} \quad (7)$$

Operations of the steering control unit 9 and the steering unit 4 are described next. The steering control unit 9 obtains a steering angle necessary for the vehicle 1 to move along the road from an equation (8), for example, based on the position of the vehicle 1 being input from the map distribution unit 10, the road information in front of the moving vehicle 1 being input from the map distribution unit 10, the travel direction of the vehicle being input from the travel direction estimation device 11, and the yaw rate of the vehicle being input from the yaw rate sensor 12, and outputs the steering angle as the steering command value $\theta_{ref}$ to the steering unit 4.

$$\theta_{ref} = k_1 y_{Ld} + k_2 e_{Ld} + k_3 \gamma \quad (8)$$

Figure 6:
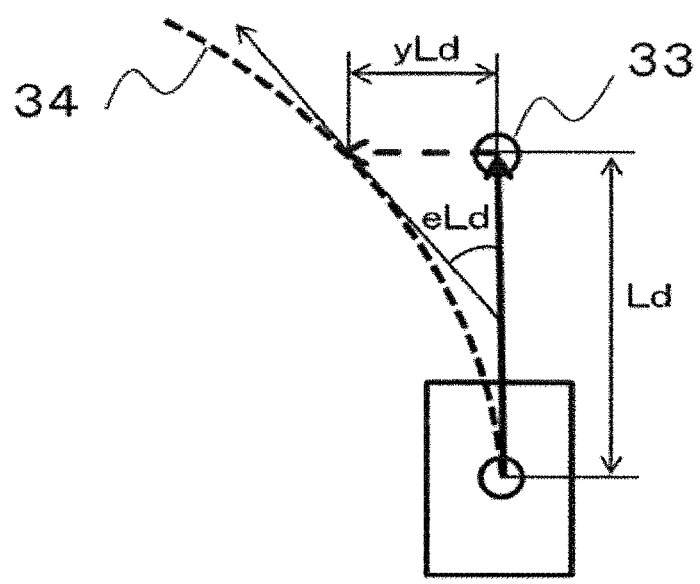
FIG. 6 A diagram for describing an operation of the vehicle system provided with the travel direction estimation device according to the embodiment 1 of the present invention.

In the equation (8), each of k1, k2, k3 is a control gain. FIG. 6 is a diagram for describing an operation of a vehicle system provided with the travel direction estimation device 11 according to the present embodiment, and is particularly a diagram for describing an operation of the steering control unit 9. Using FIG. 6, $y_{Ld}$ and $e_{Ld}$ in the equation (8) are described. The character $y_{Ld}$ in the equation (8) indicates a difference of a distance from a position 33, to which the vehicle 1 travels in the current travel direction by a distance Ld, to a targeted course 34. Herein, the distance Ld is a distance which the vehicle 1 travels at the current vehicle speed V for a predetermined time Td. The character $e_{Ld}$ in the equation (8) indicates a difference of an angle between the position 33 to which the vehicle 1 travels in the current travel direction by the distance Ld and the targeted course 34.

The steering unit 4 performs the steering based on the steering command value being input from the steering control unit 9, and makes the vehicle 1 move along the road. As described above, the travel direction estimation device 11 of the present embodiment includes the first angle processing unit 21 calculating the first angle based on the position of the vehicle 1 detected in the position detection unit (the satellite signal receiving unit 7), the second angle processing unit 22 calculating the second angle based on the rotational angular velocity of the vehicle 1 detected in the angular velocity detection unit (the yaw rate sensor 12) and the update interval of the position of the vehicle 1 in the position detection unit, and the travel direction processing unit 23 calculating the travel direction of the vehicle 1 based on the first angle and the second angle. According to the travel direction estimation device 11 of the present embodiment, the travel direction of the vehicle 1 can be estimated with a high degree of accuracy even when the update interval of the positional information of the vehicle 1 is long.

Figure 7:
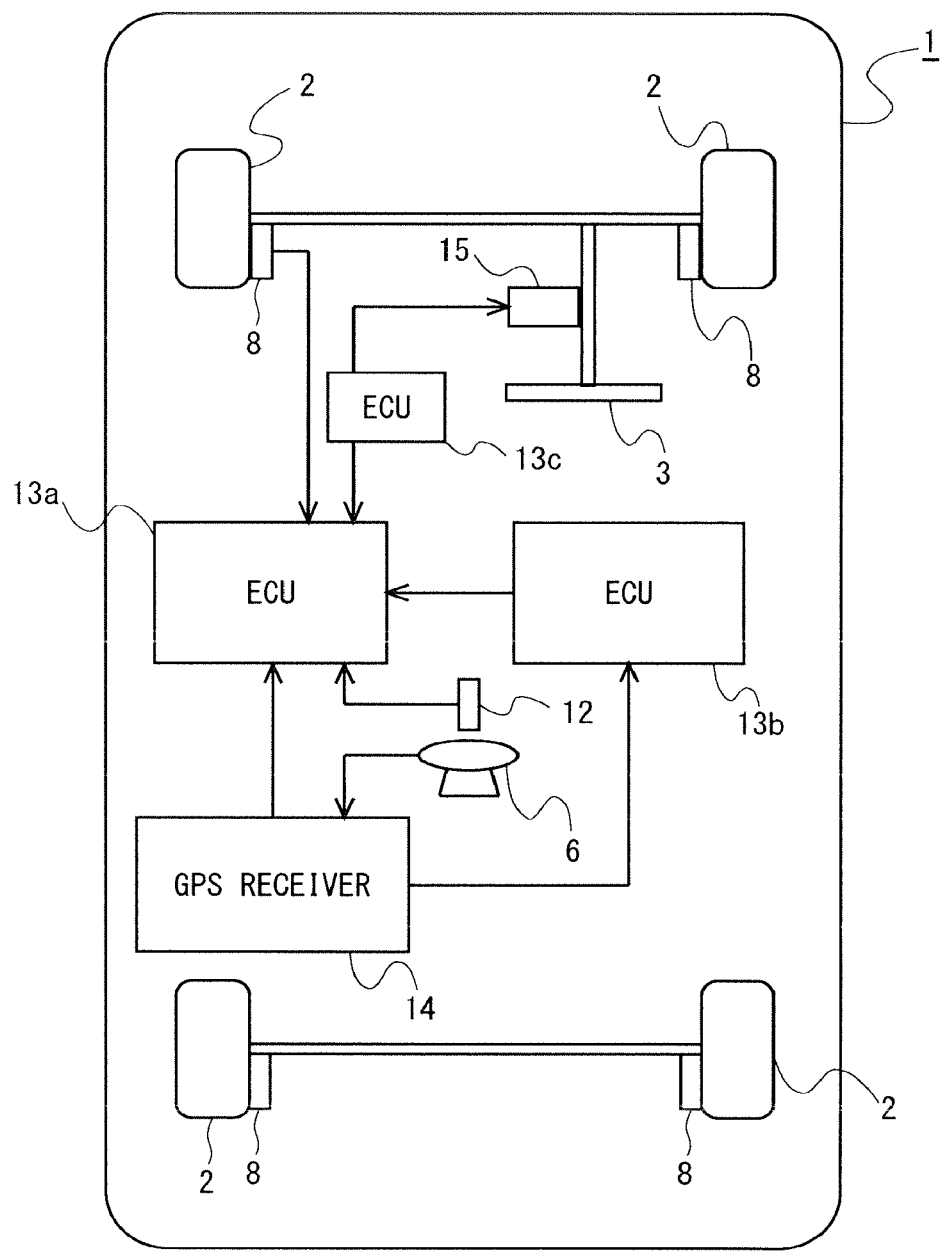
FIG. 7 A diagram illustrating an example of a hardware configuration of the vehicle system provided with the travel direction estimation device according to the embodiment 1 of the present invention.

FIG. 7 is a diagram illustrating an example of a hardware configuration of the vehicle system provided with the travel direction estimation device 11 according to the present embodiment. An ECU 13a achieves the functions of the steering control unit 9 and the travel direction estimation device 11. An ECU 13b achieves the function of the map distribution unit 10. The function of the map distribution unit 10 can also be achieved by using a function of a car navigation device which is provided separately. An ECU 13c and a motor 15 achieve the function of the steering unit 4. A GPS receiver 14 achieves the function of the satellite signal receiving unit 7.

Embodiment 2

The travel direction estimation device 11 of the embodiment 1 estimates the travel direction of the vehicle 1 every update interval T of the position of the vehicle 1 in the satellite signal receiving unit 7. However, also considered is a case where an estimation interval $T_a$ in the travel direction in the travel direction estimation device 11 is smaller than the update interval T of the position of the vehicle 1. In the above case, T=1 second and $T_a$=30 milliseconds are satisfied, for example. Such a case is assumed in the travel direction estimation device 11 according to the present embodiment.

Figure 8:
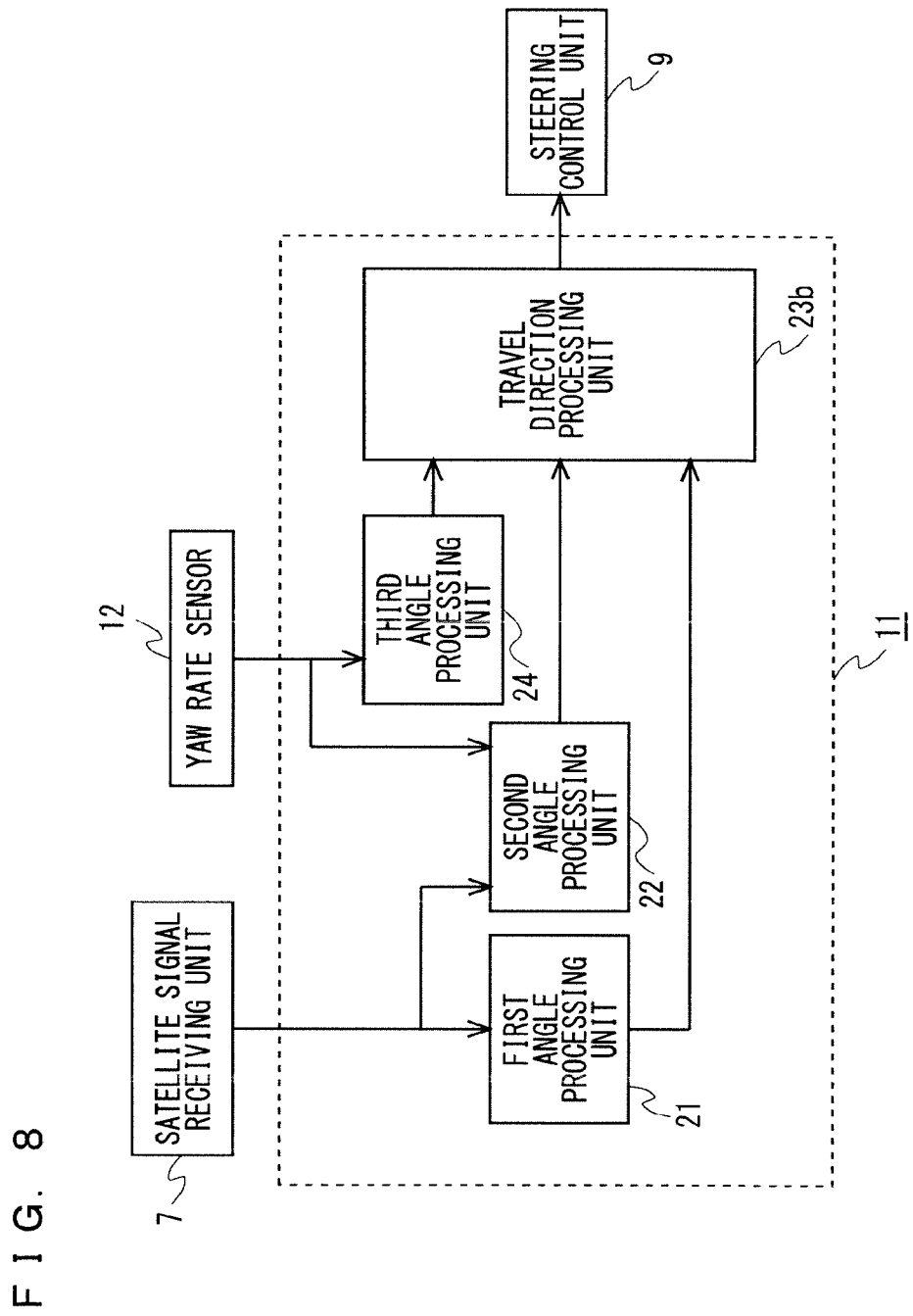
FIG. 8 A block diagram illustrating a schematic configuration of a travel direction estimation device according to an embodiment 2 of the present invention and a surrounding block.

FIG. 8 is a block diagram illustrating a schematic configuration of the travel direction estimation device 11 according to the present embodiment and a surrounding block. The system configuration of the vehicle 1 in which the travel direction estimation device 11 of the present embodiment is provided is similar to that in FIG. 1. In FIG. 8, the travel direction estimation device 11 includes the first angle processing unit 21, the second angle processing unit 22, a third angle processing unit 24, and a travel direction processing unit 23b. In the travel direction estimation device 11 of the present embodiment, the first angle processing unit 21 and the second angle processing unit 22 are similar to those in the embodiment 1, and calculate the first angle $\theta_G$ and the second angle $\theta_C$, every update interval T of the position of the vehicle 1 in the satellite signal receiving unit 7.

Figure 9:
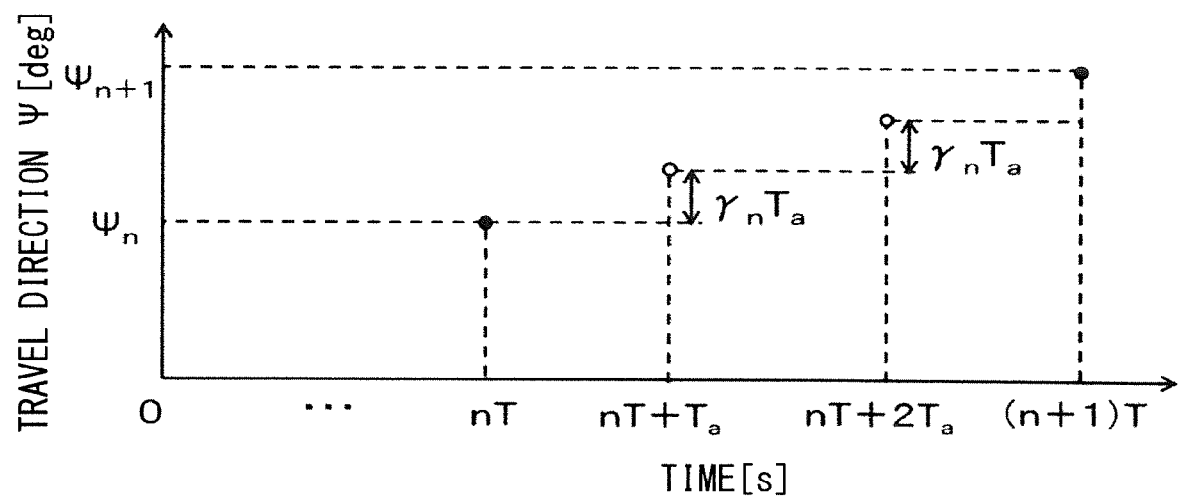
FIG. 9 A diagram for describing an operation of the travel direction estimation device according to the embodiment 2 of the present invention.

The third angle processing unit 24 calculates a third angle every estimation interval $T_a$ in the travel direction using the yaw rate γ being input from the yaw rate sensor 12. The travel direction processing unit 23b obtains the travel direction of the vehicle 1 every estimation interval $T_a$ in the travel direction based on the first angle, the second angle, and the third angle. FIG. 9 is a diagram for describing an operation of the travel direction estimation device 11 according to the present embodiment. In FIG. 9, for simplifying the description, the update interval T of the position of the vehicle 1 is three times as long as the estimation interval $T_a$ in the travel direction. In FIG. 9, a horizontal axis indicates a time, and a vertical axis indicates a travel direction. In FIG. 9, the travel direction is expressed by an angle from a predetermined direction.

As illustrated in FIG. 9, the travel direction estimation device 11 of the present embodiment adds the second angle $\theta_C$ to the first angle $\theta_G$ at the time nT, thereby estimating the travel direction $\Psi_n$. This operation is similar to the operation described in the embodiment 1. Herein, the time nT is the same as the time T1 at which the satellite signal receiving unit 7 has updated the position of the vehicle 1 to the latest information. In a period from the time nT to the time (n+1)T, the travel direction estimation device 11 adds a value obtained by integrating the yaw rate γ every estimation interval $T_a$ in the travel direction, and sets a new travel direction. The third angle is obtained by integrating a value of integral of the yaw rate γ. A value which is continually detected may be used as the yaw rate γ. A yaw rate $\gamma_n$ at the time nT is used as the yaw rate, the yaw rate $\gamma_n$ does not change in the period from the time nT to the time (n+1)T, thus the value of integral can be calculated by a product of the yaw rate $\gamma_n$ at the time nT and an elapsed time from the time nT. In FIG. 9, the third angle at a time nT+$T_a$ is obtained by a product of the yaw rate $\gamma_n$ and the time $T_a$. In FIG. 9, the third angle at a time nT+2$T_a$ is obtained by a product of the yaw rate $\gamma_n$ and a time 2$T_a$.

The third angle processing unit 24 resets the third angle every update interval T of the position of the vehicle 1 to be zero. Accordingly, the third angle is 0 at the time nT. In the period from the time nT to the time (n+1)T, the third angle processing unit 24 integrates the yaw rate γ, which corresponds to the elapsed time from the time nT, every estimation interval $T_a$ in the travel direction, and outputs the yaw rate γ as the third angle. That is to say, the third angle is obtained by integrating the yaw rate corresponding to the elapsed time after the satellite signal receiving unit 7 updates the position of the vehicle 1. The travel direction processing unit 23b adds the first angle, the second angle, and the third angle every estimation interval $T_a$ in the travel direction, thereby obtaining the travel direction of the vehicle 1.

Figure 10:
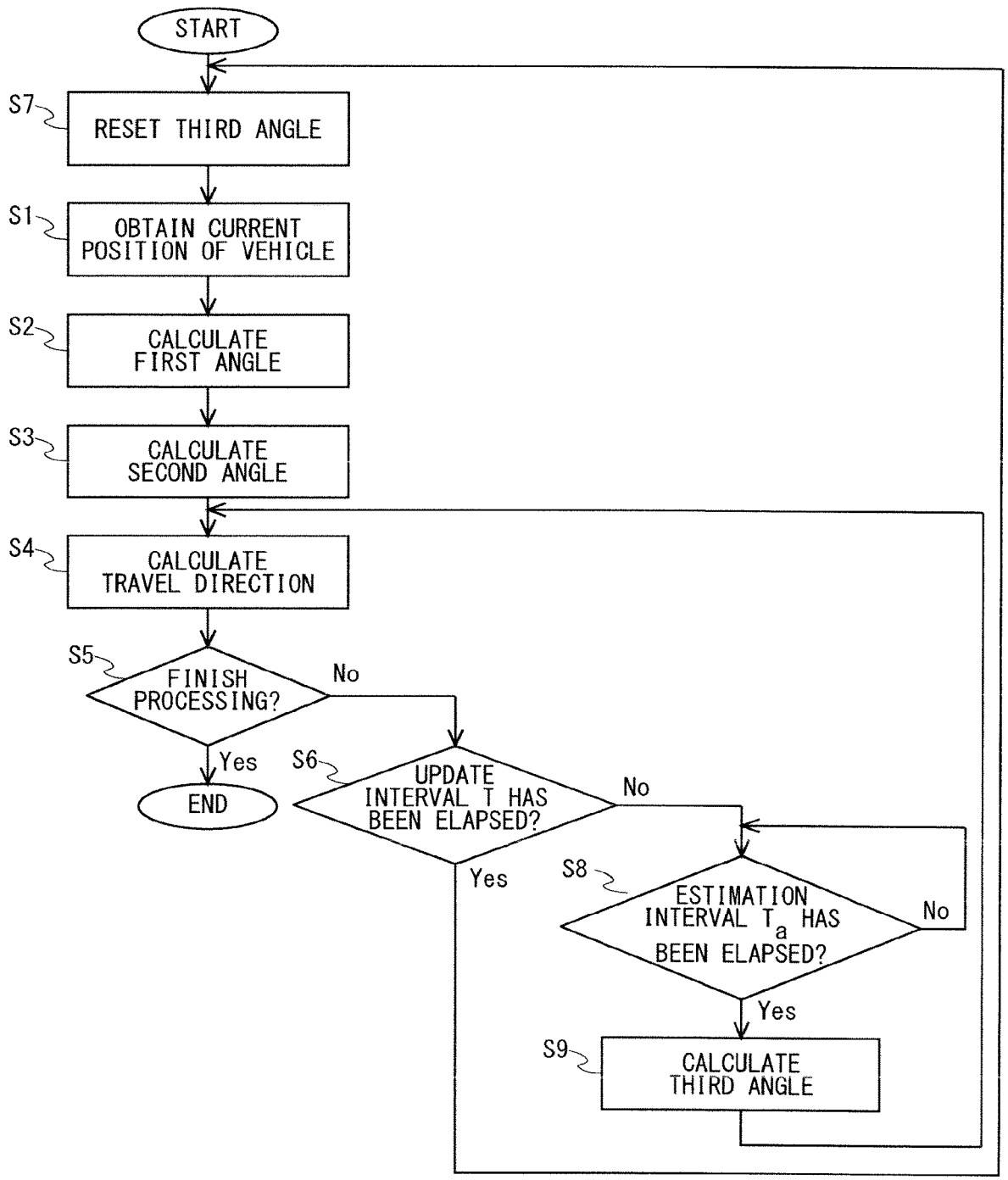
FIG. 10 A flow chart illustrating an example of a processing procedure of the travel direction estimation device according to the embodiment 2 of the present invention.

FIG. 10 is a flow chart illustrating an example of a processing procedure of the travel direction estimation device 11 according to the present embodiment. The processing of the travel direction estimation device 11 according to the present embodiment is described using FIG. 10. Firstly, the third angle processing unit 24 resets the third angle to set the value of the third angle to zero (S7). Next, the first angle processing unit 21 obtains the current position of the vehicle 1 from the satellite signal receiving unit 7 (S1). Next, the first angle processing unit 21 calculates the first angle based on the current position of the vehicle 1 and the position of the vehicle 1 which has been obtained last time (S2). Next, the second angle processing unit 22 calculates the second angle $\theta_C$ using the yaw rate $\gamma$ being input from the yaw rate sensor 12 and the update interval T of the position of the vehicle 1 being input from the satellite signal receiving unit 7 (S3). The processing in S1, S2, and S3 is similar to that in the embodiment 1.

Next, the travel direction processing unit 23 calculates the travel direction of the vehicle 1 using the first angle, the second angle, and the third angle (S4). In a state where the third angle is reset, the processing in S4 is similar to that in the embodiment 1. Next, the travel direction estimation device 11 determines whether or not the processing should be finished (S5). When the travel direction estimation device 11 determines that the processing should be finished, the travel direction estimation device 11 finishes the processing. When the travel direction estimation device 11 determines that the processing should not be finished, the processing of the travel direction estimation device 11 makes the transition to S6. In S6, the travel direction estimation device 11 determines whether or not a time elapsed since the first angle processing unit 21 obtains the position of the vehicle 1 in S1 reaches the update interval T. When the time of the update interval T has not been elapsed, the processing of the travel direction estimation device 11 makes the transition to S8. When the time of the update interval T has been elapsed, the processing of the travel direction estimation device 11 returns to S7.

In S8, the travel direction estimation device 11 determines whether or not a time elapsed since the travel direction processing unit 23 calculates the travel direction of the vehicle 1 in S4 reaches the estimation interval $T_a$. When the time of the estimation interval $T_a$ has not been elapsed, the travel direction estimation device 11 waits until the time of the estimation interval $T_a$ is elapsed. When the time of the estimation interval $T_a$ has been elapsed, the processing of the travel direction estimation device 11 makes the transition to S9. In S9, the third angle processing unit 24 calculates the third angle. After the processing of S9, the processing of the travel direction estimation device 11 returns to S4. The travel direction estimation device 11 of the present embodiment operates as described above.

According to the travel direction estimation device 11 of the present embodiment, the travel direction is continuously output compared to a case of updating the travel direction every update interval T of the position of the vehicle 1. Accordingly, in the vehicle 1 provided with the travel direction estimation device 11 of the present embodiment, the value of the steering command value in the steering control unit 9 can be smoothed, thus comfort of a passenger can be improved. Although the travel direction estimation device 11 is described herein, it is also applicable to have a configuration of interpolating the position of the vehicle in the period from the time nT to the time (n+1)T outside the travel direction estimation device 11 and incorporate the configuration in the vehicle together with the travel direction estimation device 11 of the present embodiment.

Embodiment 3

In the travel direction estimation device 11 of the embodiment 1, the update interval T of the position of the vehicle 1 in the satellite signal receiving unit 7 is the predetermined time interval. However, the update interval T of the position of the vehicle 1 needs not necessarily be the predetermined time interval. A case where the update interval T of the position of the vehicle 1 is not predetermined is assumed in the travel direction estimation device 11 according to the present embodiment.

Figure 11:
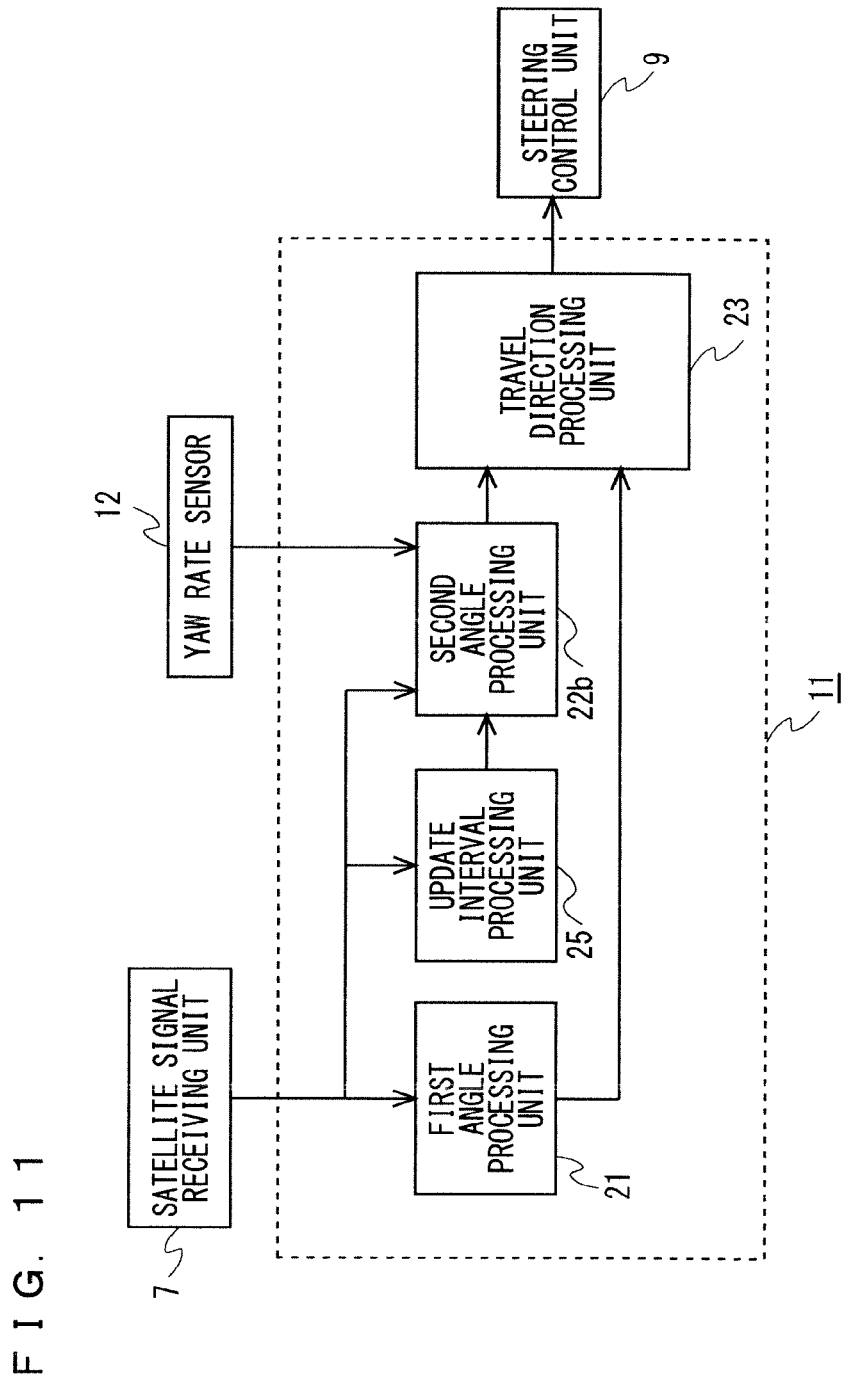
FIG. 11 A block diagram illustrating a schematic configuration of a travel direction estimation device according to an embodiment 3 of the present invention and a surrounding block.

FIG. 11 is a block diagram illustrating a schematic configuration of the travel direction estimation device 11 according to the present embodiment and a surrounding block. The system configuration of the vehicle 1 in which the travel direction estimation device 1 of the present embodiment is provided is similar to that in FIG. 1. However, the satellite signal receiving unit 7 adds information of a time at which the positional signal is updated to the positional signal and output the positional signal. In FIG. 11, the travel direction estimation device 11 includes the first angle processing unit 21, a second angle processing unit 22*h*, the travel direction processing unit 23, and an update interval processing unit 25. In the travel direction estimation device 11 of the present embodiment, the first angle processing unit 21 and the travel direction processing unit 23 are similar to those in the embodiment 1. In the travel direction estimation device 11 of the present embodiment, the second angle processing unit 22*b* is similar to that in the embodiment 1 except that the update interval T of the position of the vehicle 1 is input from the update interval processing unit 25.

The update interval processing unit 25 refers to the information of the time at which the positional signal being output from the satellite signal receiving unit 7 is updated, and calculates a difference of the updated time to obtain the update interval T. Since the satellite signal transmitted from the satellite 5 includes the time information, the satellite signal receiving unit 7 outputs the time, at which the position is detected, using this information. According to the travel direction estimation device 11 according to the present embodiment, the travel direction of the vehicle 1 can be estimated with a high degree of accuracy even when the update interval of the positional information being output from the satellite signal receiving unit 7 fluctuates or becomes discontinuous.

Embodiment 4

The travel direction estimation device 11 in the embodiment 1 has the configuration on an assumption that the change of the vehicle speed in the update interval T of the position of the vehicle 1 is sufficiently small. However, the vehicle speed is not necessarily constant in the update interval T of the position of the vehicle 1. A case where the vehicle speed changes to the extent not negligible in the update interval T of the position of the vehicle 1 is assumed in the travel direction estimation device 11 according to the present embodiment.

Figure 12:
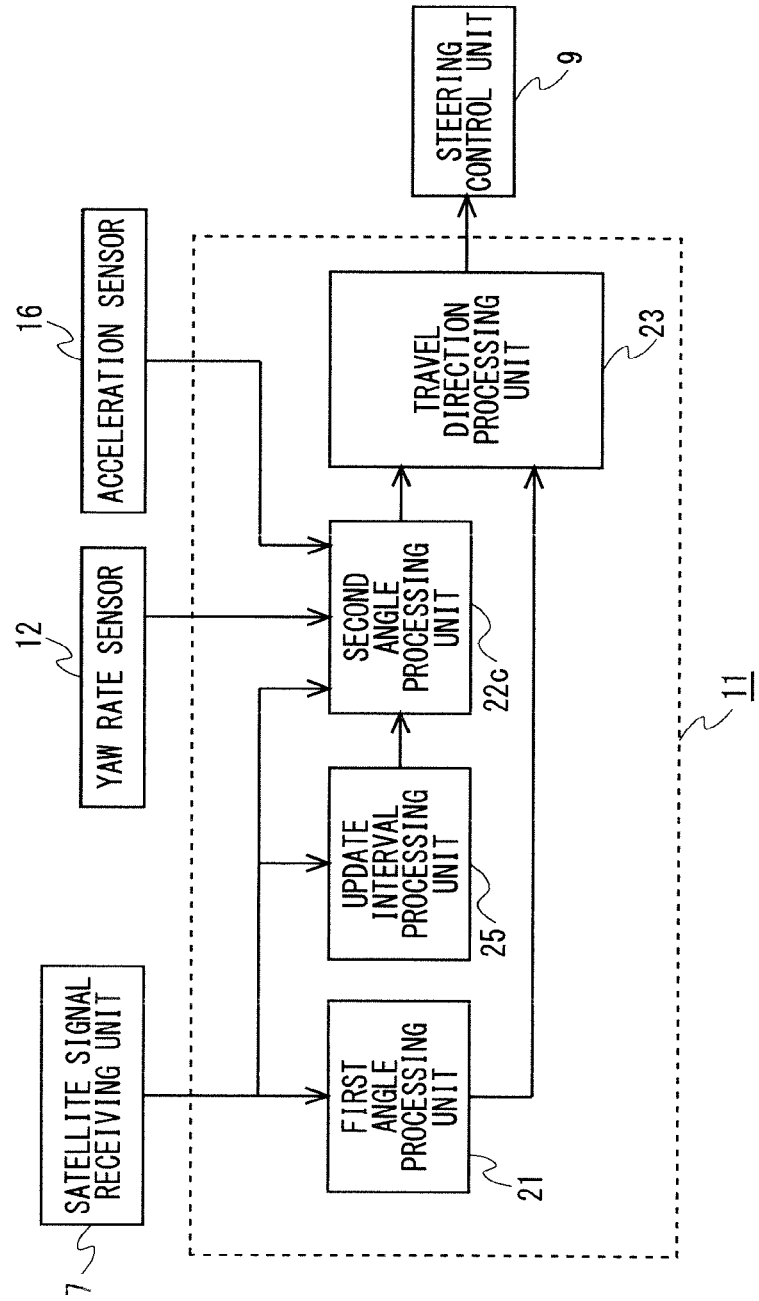
FIG. 12 A block diagram illustrating a schematic configuration of a travel direction estimation device according to an embodiment 4 of the present invention and a surrounding block.

FIG. 12 is a block diagram illustrating a schematic configuration of the travel direction estimation device 11 according to the present embodiment and a surrounding block. The system configuration of the vehicle 1 in which the travel direction estimation device 11 of the present embodiment is provided is similar to that in FIG. 1 except that an acceleration sensor 16 is newly provided. The acceleration sensor 16 detects an acceleration rate in an anteroposterior direction (an acceleration rate in a travel direction) of the vehicle 1. In FIG. 12, the travel direction estimation device 11 includes the first angle processing unit 21, a second angle processing unit 22*c*, the travel direction processing unit 23, and the update interval processing unit 25. In the travel direction estimation device 11 of the present embodiment, the first angle processing unit 21 and the travel direction processing unit 23 are similar to those in the embodiment 1. In the travel direction estimation device 11 of the present embodiment, the update interval processing unit 25 is similar to that in the embodiment 3.

The second angle processing unit 22c calculates the second angle $\theta_C$ from an equation (9) using the yaw rate $\gamma$ being input from the yaw rate sensor 12 and the update interval T of the position of the vehicle 1 being input from the update interval processing unit 25. In the equation (9), $k_a$ is a coefficient changing in accordance with an acceleration rate detected by an acceleration sensor. The equation (9) is the same as the equation (2) except that the coefficient $k_a$ is multiplied. The travel direction processing unit 23 adds the first angle and the second angle, thereby obtaining the travel direction of the vehicle 1.

$$\theta_C = \frac{k_a}{2} \gamma T \qquad (9)$$

When the travel direction is estimated on an assumption that the vehicle speed is sufficiently small, the travel direction of the vehicle 1 is estimated larger than the actual one in a case where the vehicle 1 increases speed, and the travel direction of the vehicle 1 is estimated smaller than the actual one in a case where the vehicle 1 decreases speed. Accordingly, in the travel direction estimation device 11 of the present embodiment, the second angle processing unit 22c adjusts a value of a coefficient $k_a$ based on the acceleration rate of the vehicle 1, and adjusts a measure of the second angle $\theta_C$. Specifically, in the travel direction estimation device 11 of the present embodiment, the second angle processing unit 22c decreases the coefficient $k_a$ to be smaller than one in the case where the vehicle 1 increases speed, and increases the coefficient $k_a$ to be larger than one in the case where the vehicle 1 decreases speed. The second angle processing unit 22c increases the value of the coefficient $k_a$ as a degree of acceleration of the vehicle 1 gets large, and decreases the value of the coefficient $k_a$ as a degree of deceleration of the vehicle 1 gets large. When the vehicle does not increase or decrease speed, the value of the coefficient $k_a$ is one. In this case, the equation (9) is the same as the equation (2). According to the travel direction estimation device 11 of the present embodiment, the travel direction can be estimated with a higher degree of accuracy even when the vehicle 1 increases or decreases speed.

The invention claimed is:

1. A travel direction estimation device being mounted on a vehicle including a position detector and an angular velocity detector to estimate a travel direction of the vehicle, comprising:
    circuitry configured to
    calculate a first angle based on a change of a position of the vehicle being detected in the position detector and updated at a predetermined time interval;
    calculate a second angle $\theta_c$ based on a rotational angular velocity $\gamma$ of the vehicle being detected in the angular velocity detector and an update interval T of the position of the vehicle being detected in the position detector; and
    calculate the travel direction of the vehicle based on a sum of the first angle and the second angle, wherein
    the circuitry is configured to calculate the first angle by an arctangent operation on a latitudinal change of the position of the vehicle divided by a longitudinal change of the position of the vehicle, and
    the circuitry is configured to calculate the second angle $\theta_c$ by a calculation of $\theta_c = (\gamma \times T)/2$ using the rotational angular velocity $\gamma$ and the update interval T.

2. The travel direction estimation device according to claim 1, wherein
    the circuitry is configured to adjust a measure of the second angle based on an acceleration rate of the vehicle being detected by an acceleration sensor being provided outside.

3. The travel direction estimation device according to claim 2, wherein
    the circuitry is configured to decrease the second angle in a case where the vehicle increases speed compared to a case where the vehicle decreases speed.

4. The travel direction estimation device according to claim 1, wherein
    the circuitry is configured to calculate the first angle based on a change between a latest position of the vehicle and a position of the vehicle immediately before being updated to the latest position.

5. The travel direction estimation device according to claim 1, wherein the circuitry is configured to
    integrate the rotational angular velocity at an elapsed time from a time at which the position detector has updated the position of the vehicle to a latest position to calculate a third angle; and
    calculate the travel direction of the vehicle based on the first angle, the second angle, and the third angle.

6. The travel direction estimation device according to claim 1, wherein
    the circuitry is configured to calculate the first angle by said arctangent operation on a quotient of a dividend constituting a difference between a first latitudinal position of the vehicle at a first time and a second latitudinal position of the vehicle at a second time and a divisor constituting a difference between a first longitudinal position of the vehicle at the first time and a second longitudinal position of the vehicle at the second time according to $$\theta_G = \arctan\left(\frac{Y_n - Y_{n-1}}{X_n - X_{n-1}}\right),$$

wherein $\theta_G$ is the first angle, $Y_n$ is the first latitudinal position, $Y_{n-1}$ is the second latitudinal position, $X_n$ is the first longitudinal position, $X_{n-1}$ is the second longitudinal position, n is the first time, and n−1 is the second time that precedes the first time.

7. The travel direction estimation device according to claim 5, wherein the circuitry is configured to
    reset the third angle every update interval of the position of the vehicle, and integrate the rotational angular velocity at a first time interval from a time at which the position of the vehicle is updated to a time at which the travel direction of the vehicle is calculated to calculate the third angle, and
    calculate the travel direction of the vehicle at the first time interval based on the first angle, the second angle, and the third angle.

8. A travel direction estimation device being mounted on a vehicle including a position detector and an angular velocity detector to estimate a travel direction of the vehicle, comprising:
   circuitry configured to
   calculate a first angle based on a change of a position of the vehicle being detected in the position detector and updated at a predetermined time interval, wherein the circuitry is configured to calculate the first angle by an arctangent operation on a latitudinal change of the position of the vehicle divided by a longitudinal change of the position of the vehicle;
   calculate a second angle based on a rotational angular velocity of the vehicle being detected in the angular velocity detector and an update interval of the position of the vehicle being detected in the position detector; and
   calculate the travel direction of the vehicle based on a sum of the first angle and the second angle, wherein
   the circuitry is configured to adjust a measure of the second angle based on an acceleration rate of the vehicle being detected by an acceleration sensor being provided outside.

9. The travel direction estimation device according to claim 8, wherein
   the circuitry is configured to decrease the second angle in a case where the vehicle increases speed compared to a case where the vehicle decreases speed.

10. The travel direction estimation device according to claim 8, wherein
   the circuitry is configured to calculate the first angle based on a change between a latest position of the vehicle and a position of the vehicle immediately before being updated to the latest position.

11. The travel direction estimation device according to claim 8, wherein the circuitry is further configured to
   integrate the rotational angular velocity at an elapsed time from a time at which the position detector has updated the position of the vehicle to a latest position to calculate a third angle; and
   calculate the travel direction of the vehicle based on the first angle, the second angle, and the third angle.

12. The travel direction estimation device according to claim 11, wherein the circuitry is configured to
   reset the third angle every update interval of the position of the vehicle, and integrate the rotational angular velocity at a first time interval from a time at which the position of the vehicle is updated to a time at which the travel direction of the vehicle is calculated to calculate the third angle, and
   calculate the travel direction of the vehicle at the first time interval based on the first angle, the second angle, and the third angle.

* * * * *